United States Patent [19]

Ingrao

[11] 3,761,680

[45] Sept. 25, 1973

[54] ELECTRIC STOVES

[76] Inventor: Benedict Ingrao, 2437 N. 73rd Ave., Elmwood Park, Ill. 60635

[22] Filed: May 15, 1972

[21] Appl. No.: 253,437

Related U.S. Application Data

[63] Continuation-in-part of Ser. No. 693,270, Dec. 26, 1967, Pat. No. 3,578,951.

[52] U.S. Cl............... 219/456, 219/444, 219/460, 219/463, 219/467
[51] Int. Cl. ............................................ H05b 3/68
[58] Field of Search.................... 219/444, 245, 447, 219/455, 456, 459, 460, 463, 467

[56] References Cited
UNITED STATES PATENTS

| | | | |
|---|---|---|---|
| 2,250,357 | 7/1941 | Challet............................... | 219/456 |
| 2,288,967 | 7/1942 | Challet............................... | 219/456 |
| 3,235,709 | 2/1966 | Fischer............................... | 219/450 |
| 3,384,735 | 5/1968 | Linger................................ | 219/456 |
| 3,384,736 | 5/1968 | Nowosielsky....................... | 219/456 |
| 3,440,406 | 4/1969 | Sego, Jr. ............................ | 219/444 |
| 3,578,951 | 5/1971 | Ingrao................................ | 219/444 |

Primary Examiner—Volodymyr Y. Mayewsky
Attorney—Alberts, Brezina & Lund

[57] ABSTRACT

Electric stove in which the heating element can be lowered to remove the heat source from the bottom of a pot or pan on the stove. The heating element is lowered at the end of a cooking cycle, or at any other time, to prevent over-cooking, scorching of food, or boil-overs. The stove is provided with a pot support and an integrated heating element. The heating element is supported in a hinged manner and means are provided so that the heating element can be raised on hinged means for cleaning of the stove. Controls are provided to lower the heating element and resilient means are provided to normally hold the horizontal surface level of the heating element slightly above the horizontal surface level of the pot support with the weight of a pot being sufficient to lower the horozintal surface level of the heating element to the horizontal surface level of the pot support. Provided with the resilient means is a limited tilting action of the heating element to insure that all top surface portions of the heating element will contact all bottom portions of a pot on the pot support. Channel means are provided to permit escapement of trapped heated air. And the heating element is supported at its balance center.

13 Claims, 16 Drawing Figures

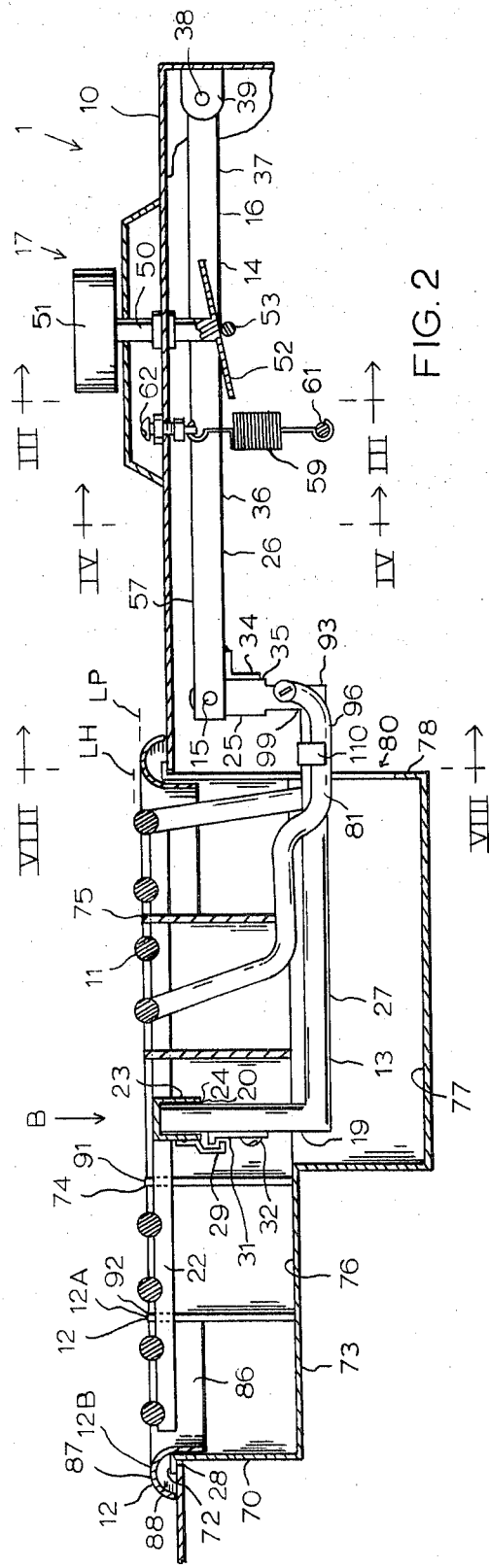

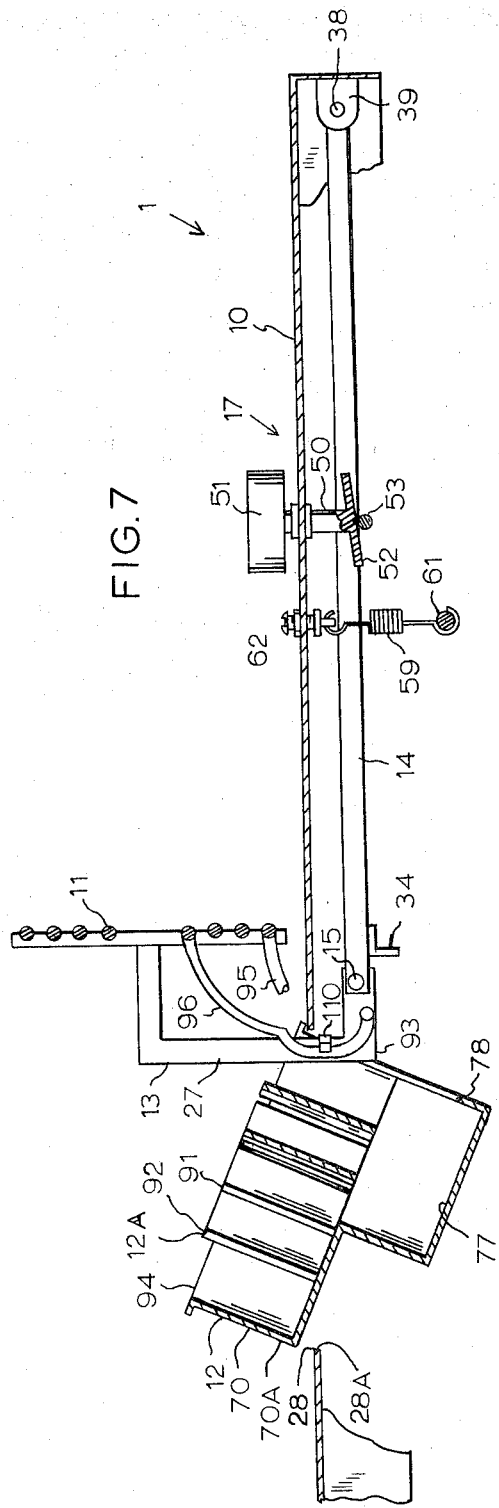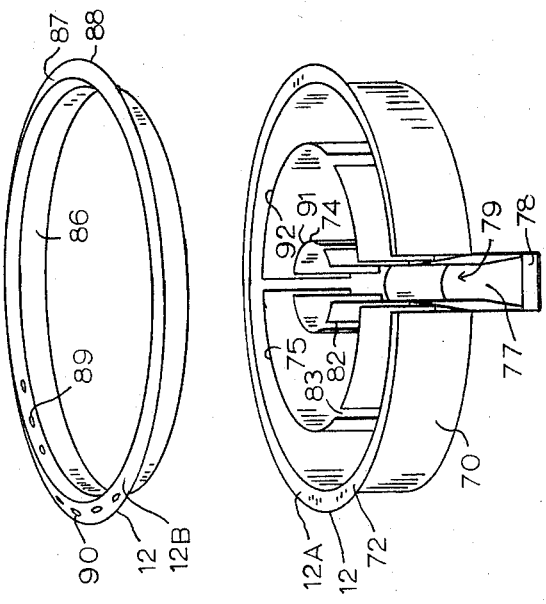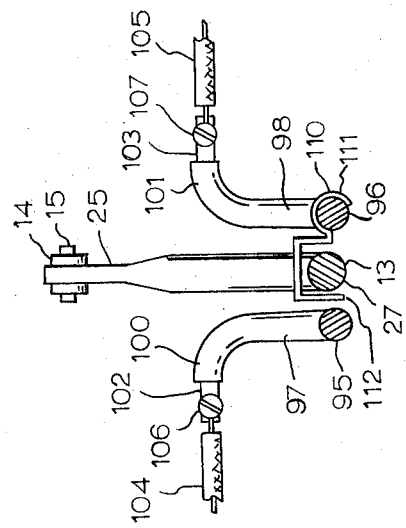

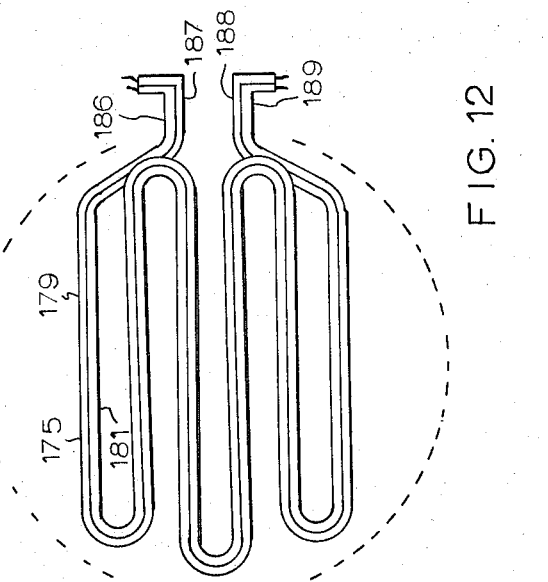
FIG. 10
FIG. 12
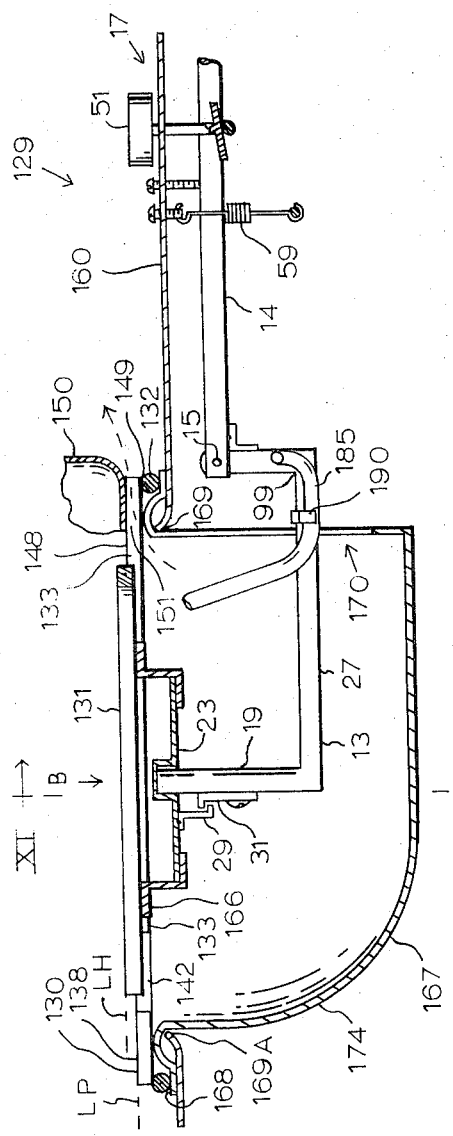
FIG. 11

ELECTRIC STOVES

This application of a continuation-in-part to an original patent on "Electric Stoves" on which a U.S. Pat. No. 3,578,951, was issued on May 18, 1971. This application contains subject matter shown, described and claimed in the original patent. Said subject matter being claimed in independent form herein. This application also contains new subject matter not shown, described or claimed in the original patent. This application is filed by the same inventor.

This invention relates to an improvement in electric ranges. More particularly, it relates to electric ranges in which the heating element can be lowered to remove the heat source from the bottom of a pot. The heating element can be lowered at the end of a cooking cycle, or at any other time, in order to prevent over-cooking, scorching of food, or boil-overs.

It is well known that electric ranges have an inherent ability to store up heat in the heating elements, and when a range is turned to an "OFF" position, the stored-up heat in the element continues to be transmitted to a pot thereon, making it necessary, many times, to physically remove the pot from said element.

This invention was developed to provide electric ranges with an efficient means of operation and efficient means of controlling the vertical movement of the heating element. This stove is simple in construction and economical to manufacture. It is durable and trouble-free in operation and is easy to clean.

It is an object of this invention to provide electric ranges with a pot support and heating element arrangement in which the heating element can be lowered.

It is an object that the top surface level of the heating element is normally positioned a slight distance above the top surface level of the pot support, with the weight of a pot placed on the heating element being sufficient to lower the horizontal top surface level of the heating element to the horizontal top surface level of the pot support against the action of an upwardly urging resilient means.

It is also an object to provide the heating element with a limited tilting means, from the horizontal plane, so that with the aid of the upwardly urging resilient means all top surface portions of the heating element will make contact with all portions of the bottom of a pot.

It is also an object to provide the heating element and pot support arrangement with channel means to permit the escapement of trapped heated air.

It is also an object to provide hinged means for supporting the heating element.

It is also an object to provide the heating element with hinged means so that it may be raised to a vertical position in the cleaning operation.

It is also an object to support the heating element at its balance center of gravity so that the limited tilting action may function properly.

It is also an object to provide the heating element with loosely coupled anti-rotational means to prevent the heating element from revolving horizontally on its vertical axis.

It is also an object to provide a spiral type heating element with portions of pot support interposed between portions of said spiral.

It is also an object to provide a grill type heating element with portions of a grill type pot support interposed between straight portions of said heating element.

It is also an object to provide the grill type heating element with a double element which is disposed in side-by-side fashion.

It is also an object to provide the heating elements with horizontally-opposing electrical supply means.

It is also an object to provide a support for the heating element which is substantially 'U' shaped and which has its hinged portion disposed (remotely from) the element opening in the top panel of the stove.

This invention contemplates other objects, advantages and features which will become more fully apparent from the following detailed description taken in conjunction with the accompanying drawings which illustrate preferred embodiments and in which:

FIG. 2 is a cut-away side view, and partial cross-sectional view of the stove shown in FIG. 1 taken substantially along lines II—II.

FIG. 3 is a cross-sectional end view of the control means for the stove in FIG. 1 and 2 taken along lines III—III in FIG. 2.

FIG. 4 is a cross-sectional end view of the suspension means for the stove in FIGS. 1 and 2 taken along lines IV—IV in FIG. 2.

FIG. 5 is a front view of the pot support for the stove in FIGS. 1 and 2.

FIG. 6 shows a pot support collar for the stove in FIGS. 1 and 2.

FIG. 7 is a cross-sectional side view of the stove shown in FIGS. 1 and 2. The heating element is shown in a raised position with the pot support partially removed in preparation for the cleaning operation.

FIG. 8 is a cross-sectional end view of the arrangement of the heating element support member and the heating element terminal ends taken along lines VIII—VIII in FIG. 2.

FIG. 10 is a cross-sectional side view of the grill type heating element and pot support shown in FIG. 9 taken along lines X—X.

FIG. 11 is a cross-sectional end view of the grill type heating element and pot support shown in FIGS. 9 and 10 taken along lines XI—XI in FIG. 10.

FIG. 12 is a top plan view of an alternate type of grill type heating element.

Figure 1:
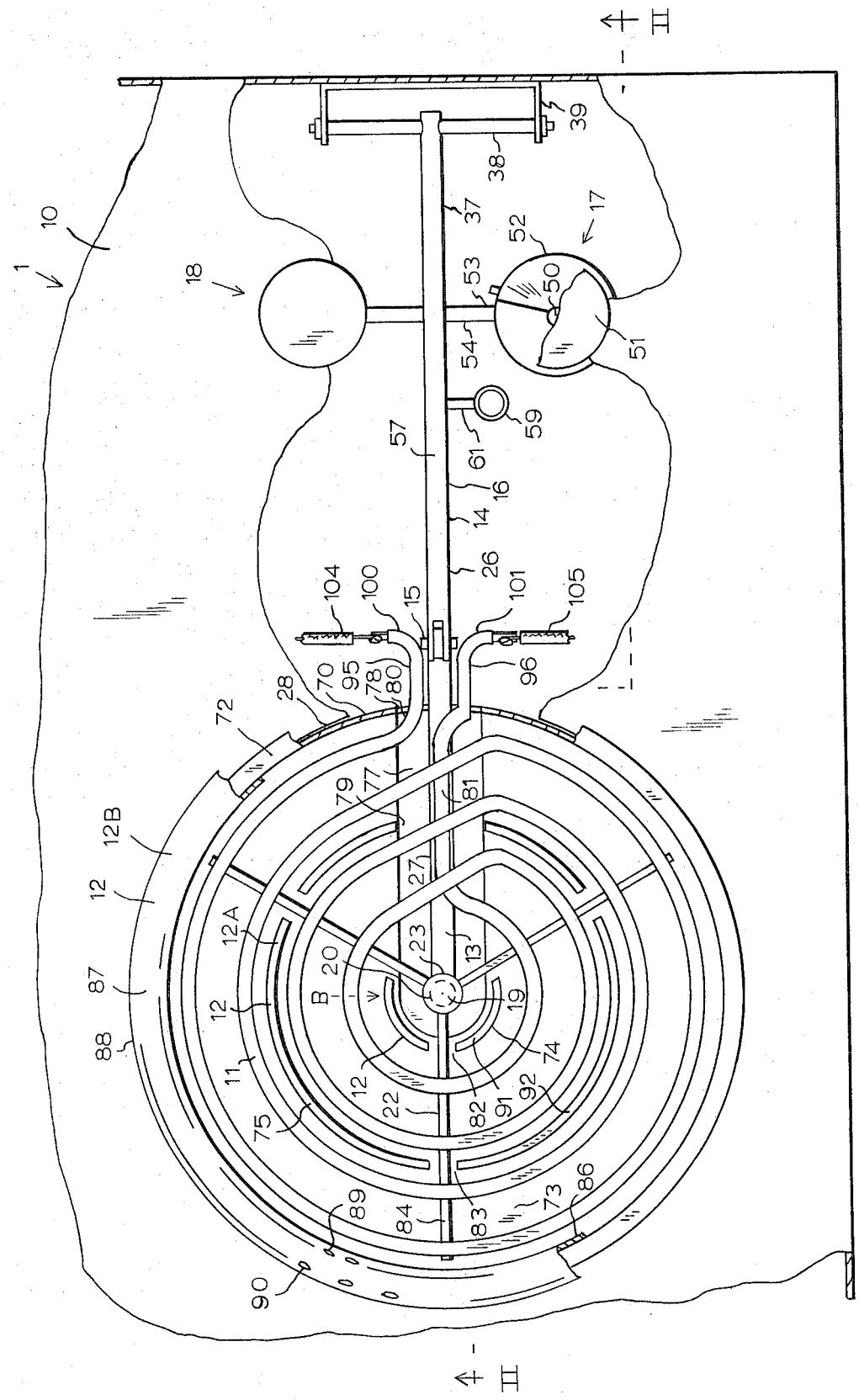
FIG. 1 is a top plan view of a stove constructed according to the principals of this invention; a portion of the top panel is cut away to show the mechanical features. Also shown is a spiral type coiled heating element.

FIG. 1 shows a cut-away top plan view of a stove constructed according to the principals of this invention.
FIG. 2 shows a cut-away and partially cross-sectioned side view of the stove in FIG. 1 taken along lines II—II in FIG. 1. Shown in FIGS. 1 and 2 are the top panel 10 of the stove 1. Also shown are a heating element 11, a pot support 12, a first horizontally disposed heating element support member 13, and a second horizontally disposed support member 14 for supporting the heating element support member 13. The first support member 13 and the second support member 14 are joined together by a pivot pin 15, the action of which will be explained later. The two support members 13 and 14, so joined, form a single rigid horizontally disposed support member 16 and work together as a single unit when the heating element 11 is lowered. Also shown in FIGS. 1 and 2 are the control means 17 and 18.

The heating element 11, in FIGS. 1 and 2, is shown as being of the tubular sheathed type. It is shown as being spirally coiled and horizontally disposed. The heating element 11 is suitably balanced and the free end 19 of the first support member 13 is loosely fitted 20 at the balance center B of the heating element 11. The heating element 11 is held together and supported by a frame 22 which has a central portion 23 which couples with the said free end 19 of the first support member 13. The central portion 23 is vertically bored 24 for a short distance from underneath with the free end 19 of the first support member 13 being loosely fitted into said bore 24. This loose connection permits a limited tilting action of the heating element 11, from the horizontal plane, to permit it to make contact with all portions of the bottom of a pot or pan when said pot or pan is in position on the pot support 12.

Referring to FIG. 2, the horizontally disposed first support member 13 is substantially a 'U' shaped member with the end of one arm serving as the free end 19 which supports the heating element 11 and the opposite arm 25 being pivotably joined to the free end 26 of the second support member 14 through the pivot pin 15. The 'U' shaped design serves three important purposes which are essential features of this invention. Firstly, the 'U' shaped design of the heating element support 13 prevents accidentally spilled liquids from reaching the pivot pin 15 connection, which is at a higher level than the bottom portion 27 of the 'U' shaped support member 13.

Secondly, it permits the pivotal connection 15 to be located substantially away, horizontally, from the opening 28 of the top panel 10 of the stove 1. This also serves to prevent accidentally spilled liquids from reaching the pivotal connection 15. Thirdly, with the pivotal connection 15 being located high and remote in regard to accidental spillage of liquids, the 'U' shaped design also permits the raising of the heating element 11 and the support member 13 to a vertical position, as shown in FIG. 7, for the purpose of the cleaning operation which will be described later.

As shown in FIG. 2, means are provided to prevent the heating element 11 from being accidentally pulled off the end 19 of the support member 13 or from dropping off during the cleaning operation. These means are in the form of a tab 29 which is welded to one side of the central portion 23 and a cooperating tab 31 which is detachably attached, by screw means 32, to the free arm 19 of the 'U' shaped support member 13. These locking tabs 29 and 31 are loosely coupled to prevent interference with the limited tilting action of the heating element 11.

As shown in FIG. 2, the first support member 13 and the second support member 14 are held in horizontal alignment in relation to each other by means of a tab 34 which abuts on the rear side 35 of the arm 25 of the first support member 13 to prevent the first support member 13 from pivoting below a predetermined point of alignment. The tab 34 is welded to the underside surface 36 of the free end 26 of the second support member 14.

Referring to FIGS. 1 and 2, the opposite end 37 of the second support member 14 is horizontally traversed at right angle by a supporting rod 38 which in turn is supported by a pair of brackets 39 which are secured in the stove 1, or to a frame therein (not shown). The pivotal arrangement of the rod 38 along with the supports 13 and 14 provide a hinged type support means for vertically moving the heating element 11.

Referring to FIGS. 1, 2 and 3, there is shown the control means 17 which is used to raise and lower the heating element 11. The control means 17 comprises a vertically disposed control shaft 50 which is rotatably secured through the top panel 10 of the stove 1. FIG. 3 is a cross-sectional end view taken along lines III—III in FIG. 2. A control knob 51 is secured to the top end of the control shaft 50. A horizontally disposed face cam 52 is secured to the bottom end of the control shaft 50 which cooperates with one end 53 of a horizontally disposed control rod 54 which is welded 55 at right angle on the bottom surface 36 of the second support member 14. As shown in FIGS. 3 and 4, an adjustment screw 56 may be provided to limit the upward travel of the heating element 11 so that the top surface level LH of the heating element 11 will not rise above a certain point in normal alignment above the top surface level LP of the pot support 12. The adjustment screw 56 is located between the control means 17 and 18 and traverses downwardly from the top side of the stove panel 10. The top surface 57 of the support member 14 abuts on the bottom end 58 of the adjustment screw 56 to limit the upward travel of the combination comprising of the heating element 11, the first support member 13 and the second support member 14.

Referring to FIGS. 1, 2 and 4, there is shown an expansion type support spring 59 which urges the support member 14 upwardly against the bottom end 58 of the adjustment screw 56, shown in FIGS. 3 and 4, thereby resiliently holding the heating element 11 in its normal upward position. FIG. 4 is a cross-sectional end view taken along lines IV—IV in FIG. 2. Still referring to FIGS. 1, 2 and 4, and particularly to FIG. 4, there is shown a bracket 60 which is welded to the support member 14 and which extends downwardly therefrom. The lower end 61 of the bracket 60 extends horizontally to one side for a short distance. The lower end of the support spring 59 is attached to the lower end 61 of the bracket 60 and the upper end of the support spring 59 is attached to the bottom end of the spring tension adjustment screw 62 which traverses downwardly through the stove panel 10.

In FIGS. 1, 2, 5 and 6 is shown the pot support 12. The pot support 12 is comprised of two parts. The lower part 12A, shown in FIG. 5, and the upper part 12B, shown in FIG. 6. The lower part 12A of the pot support 12 has a circular side wall 70 which is slightly less in diameter than the opening 28 in the top panel 10 of the stove 1. The top portion of the side-wall 70 has an outwardly extending flange 72 by which the pot support 12A is suspended in the opening 28 from the top panel 10 of the stove 1. The pot support 12A also has a bottom wall 73 which supports the central pot support member 74 and the intermediate pot support member 75. The bottom portions of the pot support members 74 and 75 are welded to the top surface 76 of the bottom wall 73 of the pot support 12A.

As shown in FIGS. 1, 2, 5 and 7, a trough 77 is provided which accommodates the "up" and "down" movement of the first support member 13. A barrier 78 is provided at the outward end of the trough 77 to retain any accidentally spilled liquids. Vertical channel means 79 are provided in the pot support member 74 and 75 which align with an opening 80 in the side-wall 70 of the pot support 12A to permit entry of, and vertical motion of, the first support member 13 and the end portion 81 of the heating element 11. The pot support members 74 and 75 are also provided with vertical channel means 82 and 83 respectively to permit the vertical motion of the arms 84 of the heating element frame 22 which are interposed in said channel means 82 and 83.

Referring to FIGS. 1, 2 and 6, and particularly to FIG. 6, there is shown a pot support collar 12B which is a one piece stamped ring having an inner, downwardly extending, vertical wall 86, a curved top surface forming a pot supporting surface 87 and an outwardly and downwardly extending flange 88 which seats on the top panel 10 of the stove 1, while at the same time concealing the pot support flange 72. The inner wall 86 and the flange 88 are provided with openings 89 and 90, respectively, to permit the escapement of heated air when a pot having a diameter larger than the pot support collar 12B is placed on said pot support 12A and 12B.

Referring to FIGS. 1, 2, 5, 6 and 7, and particularly to FIG. 2, it will be seen that the top portions 91 and 92 of the pot support members 74 and 75, respectively, are in horizontal alignment with the pot supporting surface 87 of the pot support collar 12B and together forming the top surface level LP of the pot support 12. A large pot placed on the pot support 12 would be supported by the pot support points 91, 92 and 87 simultaneously. A pot of smaller diameter could be supported by a lesser number of the shown pot support points 91 and 92. Referring to FIG. 2, it is seen that the top turface level LH of the heating element 11 is normally positioned a slight distance above the top surface level LP of the pot support points 91, 92 and 87. The spring 59 is calibrated to allow the weight of an empty pot or pan to lower the horizontal top surface level LH of the heating element 11 to the horizontal top surface level LP of the pot support points 91, 92 and 87. This action is referred to as "floating action" of the heating element 11. As afore mentioned, the heating element 11 is also provided with a limited "tilting action". The combination of the "floating action" and the "tilting action" makes it possible for the heating element 11 to align itself with the bottom surface of a pot so that all top surface portions of the heating element 11 are in contact with all portions of the bottom of a pot when said pot is in place on the surface level LP of the pot support 12. The spring 59 urges the heating element 11 upwardly to insure a maximum contact of the heating element 11 with the bottom of a pot placed on the pot support 12.

In operation, and referring to FIGS. 1, 2, 3 and 4, and particularly to FIGS. 2, 3 and 4, at the end of a cooking cycle, or when it is necessary to cease the cooking process immediately in order to prevent scorching of food or to stop a pot from boiling over, the heating element 11 is lowered which removes the heat source from contact with the bottom of the pot. Lowering the heating element 11 stops the cooking process almost immediately. This is accomplished by rotating the control knob 51 clock-wise which, through the action of the control shaft 50, rotates the cam 52 which applies a downward force on the control rod 54 which in turn causes the first and second support members 13 and 14, respectively, to pivot downwardly through the hinged action of the support rod 38 carrying the heating element 11 downwardly. This action being performed against the action of the upwardly urging spring 59. The heating element 11 remains in a lowered position until the control knob 51 is rotated in the reverse direction (counterclockwise). In some cooking applications it is desired to apply a large amount of radiant and convected heat to a pot. This type of cooking prevents scorching of certain types of foods. In this invention it is possible to facilitate this type of cooking by positioning the heating element 11 a suitable distance below the bottom of a pot and by applying the proper amount of heat through the heat range selector control means 18.

FIG. 7 shows a cross-sectional side view of the stove in FIGS. 1 and 2, taken substantially along lines II-II in FIG. 1. FIG. 7 shows the first support member 13 with the attached heating element 11 in a vertically raised position in preparation for replacement of the heating element 11, if needed, or for the cleaning of the pot support 12A. The pot support 12A is shown being removed at an angle to allow the barrier 78 on the pot support 12A to clear the heel portion 93 of the first support member 13. The side-wall 70 of the pot support 12A can taper downwardly and inwardly at 70A to provide clearance between the side-wall 70A and the edge 28A of the opening 28 to facilitate removal of the pot support 12A when said pot support is angled upwardly as shown in FIG. 7.

In the cleaning operation, and referring to FIGS. 1 thru 7, and particularly to FIG. 7, the heat range control means 18 is turned to "OFF" position and the control knob 51 is turned fully counter-clockwise to raise the heating element 11 and the support members 13 and 14 to full "up" position. Then the pot support collar 12B is lifted off. ( The pot support collar 12B normally is loosely fitted in its normal position on the pot support 12A as the said collar 12B rests on the top panel 10 of the stove 1.) Next, the heating element 11 and the support member 13 are raised to a vertical position. The pot support 12A is then grasped at its rearward portion 94 and raised at an angle and lifted out allowing the barrier 78 to clear the heel 93 of the support member 13. After cleaning, the parts are replaced in the reverse order.

FIG. 8 is a cross-sectional end view taken along lines VIII—VIII in FIG. 2. Shown are the heating element ends 95 and 96 which are disposed horizontally, and parallel, to the lower portion 27 of the first support member 13 and spaced therefrom. The ends 95 and 96 rise upwardly 97 and 98 for a short distance after passing the angle 99 in the support member 13, as shown in FIG. 2. The ends 95 and 96 then extend horizontally outwards in opposite directions 100 and 101 and are provided with terminals 102 and 103. Power supply leads 104 and 105 are attached to the terminals 102 and 103 by means of screws 106 and 107. The power supply leads 104 and 105 also extend horizontally-outwardly on the same horizontal plane as the ends 100 and 101. The "horizontal-opposing" arrangement of the power supply leads 104 and 105 prevents undue restraint on the "tilting action" and the "floating action" of the heating element 11. The horizontal axis of the power supply leads 104 and 105 is in a close plane with the horizontal axis of the pivot pin 15. This arrangement also prevents undue stress on the said leads 104 and 105 as the heating element 11 is moved up or down or raised to a vertical position. Also shown in FIG. 8, and in FIGS. 2 and 7, is a bracket 110 which prevents the heating element 11 from rotating horizontally on its vertical axis. One end 111 of the bracket 110 is welded to one end 96 of the heating element 11 while the other end 112 loosely surrounds the sides and top of the bottom portion 27 of the support member 13. This loose coupling also prevents interference with the "tilting action" and the "floating action" of the heating element 11.

Referring to FIGS. 1 thru 7, and particularly to FIG. 7, when it is necessary to replace the heating element 11, the heat range control means 18 is turned to the "OFF" position. The control knob 51 is then rotated counterclockwise to raise the heating element 11 to its uppermost position.

The pot support collar 12B is then lifted off. The heating element 11 is raised to a vertical position, as shown in FIG. 7. The pot support 12A is then raised at an angle and lifted out. The heating element terminal screws 106 and 107 are loosened and the power supply leads 104 and 105 are disconnected. The latch screw 32 is loosened and the latch 31 is swiveled to one side. The heating element 11 and support 13 are then lowered to a horizontal position and the heating element 11 is lifted out. Replacement of the new element 11 is in the reverse order.

Figure 9:
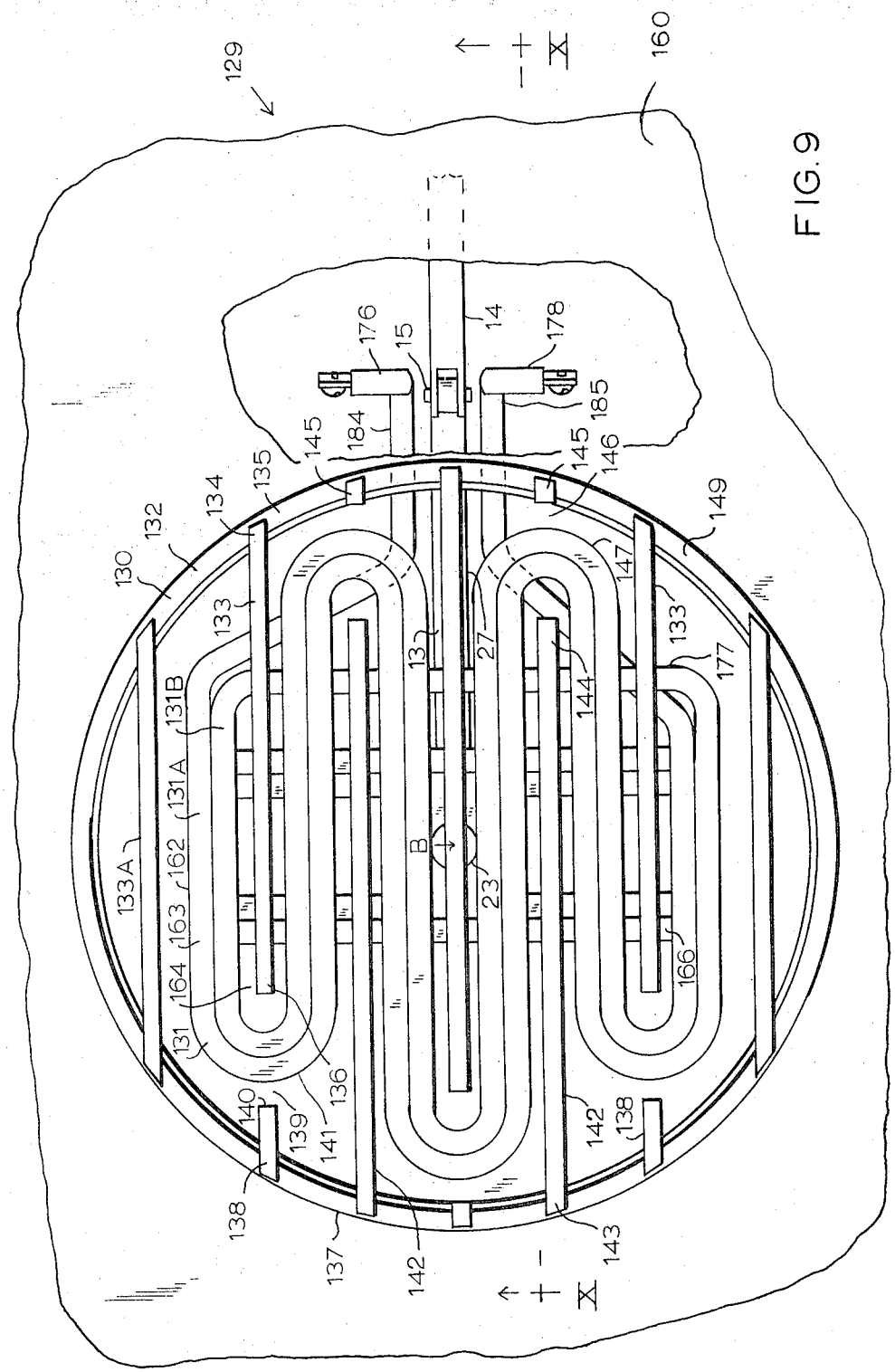
FIG. 9 is a top plan view of a grill type heating element and integrated pot support which can be used with the stove in FIGS. 1 and 2.

FIGS. 9, 10 and 11 show an alternative type of pot support and heating element arrangement which can be used with the stove 1 shown in FIGS. 1 thru 7. FIG. 9 is a top plan view of a portion of the stove 129, which is similar to stove 1 except for the heating element and pot support arrangement. FIG. 10 is a cross-sectional side view of a portion of the stove 129 taken along lines X—X in FIG. 9. FIG. 11 is a cross-sectional end view of the portion of the stove 129 taken along lines XI—XI in FIG. 10. The pot support is comprised of a first set of horizontally disposed, spaced apart, parallel pot support members which are interposed between a second set of horizontally disposed, spaced apart, parallel pot support members. The heating element has a continuing "S" design with portions forming horizontally disposed, consecutively arranged, straight runs and loops which occupy the spaces between the pot support members. The heating element is arranged for vertical movement between the said pot support members. FIG. 9 shows the grill-type pot support structure 130 and the loop type heating element 131. The pot support 130 is comprised of a circular frame member 132 which is formed from rod material. The first set of pot support rods 133 is provided. Each of them has one end 134 welded to the first side 135 of the frame 132. The free ends 136 of the rods 133 face toward the opposite side 137 of the frame 132 but do not reach said side 137. A first set of smaller support rods 138 are horizontally welded to the second, and opposite, side 137 of the frame 132 in alignment with the rods 133. A gap, or space, 139 is provided between the free ends 136 of the rods 133 and the free ends 140 of the smaller rods 138 to provide space for the heating element loops 141 which are interposed between said free ends 136 and 140. A second set of horizontally disposed pot support rods 142 are provided. Each has one of their ends 143 welded to the second side 137 of the frame 132 with the free ends 144 extending toward, but not reaching, the first side 135 of the frame 132. A second set of smaller support rods 145 is provided for cooperation with the second set of support rods 142 and are welded to the first side 135 of the frame 132 leaving a space 146 for the heating element loops 147. As shown in FIGS. 9 and 11, the first and second sets of pot support rods 133 and 142, along with their smaller cooperating support rod members 138 and 145, are arranged in alternately spaced, side by side, relation to each other. Portions of the first set of pot support rods 133 being interposed between portions of the second set of pot support rods 142. As shown in FIGS. 10 and 11, the top surface 148 of the pot support rods 133, 138, 142 and 145 form the horizontally disposed pot supporting top surface level LP of the pot support 130. All of the pot support rods 133, 138, 142 and 145 have their welded ends weldedto the top surface 149 of the frame 132. This type of pot support, due to its structure, is well ventilated and needs no additional means for providing escapement of heated air which would otherwise be trapped under the pot and in the stove. The provision of the ventilating means also makes it possible to heat the sides of a pot with the escaping heated air. In FIGS. 10 and 11 the broken arrows show the path the heated air would take if a pot larger than the diameter of the pot support 130 were placed on said pot support. Shown in cross-section in FIGS. 10 and 11 are a portion of a pot 150 as it would rest on the pot support rods 133, 138, 142 and 145, indicating the space 151 between the bottom of the pot 150 and the top panel 160 of the stove 129 by which the heated air, as indicated by the broken arrow, would pass. As shown in FIG. 9, the heating element 131 is not a conventional spiral type, but has a continuing "S" design. It has straight portions 162 which are interposed in parallel, spaced, relationship with the parallel portions of the pot support rods 133 and 142 with the curved, or loop portions 141 and 147 of the element 131 passing in the spaces 139 and 146 between the pot support rod ends 136 and 140 and 144 and 145, respectively. In this heating element design, as shown in FIGS. 9 and 11, I use two heating elements 131A and 131B in tandem, or in side-by-side manner. The heating element sheaths 163 are of small diameter which allows them to be formed easily into the continuing "S" design, and into "tight" curves. The side-by-side design permits a large heating element surface area in relation to the amount of area devoted to spacing 164 and to the pot support rods 133 and 142. The two elements 131A and 131B can be wired, electrically, in series with each other, or in parallel.

In FIG. 10, the heating element 131 is shown being supported by the horizontally disposed, hinged support members 13 and 14 which were described for the arrangement shown in FIGS. 1, 2, 3, 4 and 7. The heating elements 131A and 131B are welded 165 to a suitable frame 166, as shown in FIGS. 9, 10 and 11. The combined heating element 131 and frame 166 is balanced and the balance center B is provided with a means to allow loose coupling with the free end 19 of the first support member 13, as described for FIG. 2. Latching means 29 and 31 are also provided, as described for FIG. 2. As shown and described, this heating element 131 and pot support 130 design also has the limited "tilting action" and "floating action" described for the arrangement shown in FIGS. 1, 2, 3, 4 and 7. Referring to FIGS. 10 and 11, the horizontal top surface level LH of the heating element 131 is shown positioned slightly above the horizontal surface level LP of the pot support rods 133, 138, 142 and 145. The weight of an empty pot placed on the heating element 131 is sufficient to lower the heating element 131 downwardly, against the action of the upwardly urging spring 59, so that the top surface level LH of the heating element 131 is in horizontal alignment with the top surface level LP of the pot support rods 133, 138, 142 and 145 with the pot being supported by said pot support rods. The "tilting action" and the "floating action" with the help of the upwardly urging spring 59 causes the heating element 131 to be in contact with all portions of the bottom of the pot when the pot is resting on the said pot support 130. The heating element 131 can be lowered by rotating the control knob 51, as described for the arrangement shown in FIGS. 1, 2, 3 and 4.

It is noted that when the control knob 51 is rotated, the horizontal surface level LH of the heating element 131, in this invention, can be arranged to be lowered a suitable distance of one-fourth of an inch, for example, to as much as 1 inch below the horizontal surface level LP of the pot support, according to the design of the stove. The control means 17 can be calibrated to cause a full lowering of the heating elements 11 or 131 with only 180 degree rotation, or less, of the control knob 51. FIGS. 10 and 11 show a cross-sectional view of a conventional type reflector pan 167 which can be mounted in place by means of a flange 168 which rests on the top panel 160 of the stove 129 around the opening 169. A vertical slot 170 is provided on one side of the reflector pan 167 to permit entry, and vertical movement, of the support member 13. The grill type pot support 130 can be prevented from horizontal rotation on its vertical axis by means of pins 171 which are welded to the frame 132 and which extend downwardly to engage holes 172 in the top panel 160 of the stove 129. The pins 171 may also, simultaneously, traverse holes 173 which are provided in the flange 168 of the reflector pan 167 to prevent the said reflector pan 167 from revolving horizontally on its vertical axis.

Referring to FIG. 10, when it is necessary to clean the stove 129, the heat range control 18 (not shown) is turned to "OFF" position. The control knob 51 is then rotated counter-clockwise to bring the heating element 131 and the support members 13 and 14 to their uppermost position. The pot support 130 is then (or priorly) lifted off the top panel 160 of the stove 129.

The heating element 131 and the support member 13 are raised to a vertical position, as shown for the arrangement in FIG. 7. The reflector pan 167 is then raised out of the opening 169 at an angle, as shown for the arrangement in FIG. 7, and removed. The reflector pan 167 is also provided with a tapering side-wall 174 to clear the edge 169A of the opening 169 in the top panel 160 of the stove 129. After cleaning, the parts are replaced in the reverse order.

Referring to FIGS. 9 and 12, two types of grill-type heating elements 131 and 175 are shown which can be used with the grill-type por support 130, shown in FIGS. 9, 10 and 11. In the first type, 131, as shown in FIGS. 9, 10 and 11, the element 131 has one continuous-length sheath 163. The element 131 starts at one terminal end 176 and forms the first "continuing S" configuration 131A, after which, it then loops 77 around and forms the second "continuing S" configuration 131B which follows the first configuration 131A in side-by-side fashion. The loop portion 177 of the element 131 has a minimal amount of resistance wire (not shown) therein so that the portion 177 will not get too hot. The loop portion 177 does not engage the bottom of a pot so it does not need to get very hot. The loop portion 177 normally is disposed at right angle, and below, the first set of pot support rods 133, as shown in FIG. 9. The opposite end 178 of the element 131 terminates as a second terminal end. In the second type of grill-type heating element 175, shown in FIG. 12, two separate sheaths 179 and 181 are used in side-be-side manner. One sheath, 179, forms the outer element, and the other sheath, 181, forms the inner element, in tandem. The element sections 179 and 181 can be wired, electrically, in series or in parallel to each other.

Referring to FIGS. 9, 10 and 11, the heating element end portions 184 and 185 of element 131 journey adjacent to the bottom portion 27 of the support member 13 and after passing the angle portion 99 they rise upwardly for a short distance and then extend horizontally outward as described for the heating element ends arrangement in FIGS. 1, 2 and 8. The element ends 186, 187, 188 and 189 of element 175 are also similarly arranged. The grill-type heating elements 131 and 175 also have an anti-rotational bracket 190 as described for bracket 110, shown in FIGS. 2, 7 and 8.

Figure 13:
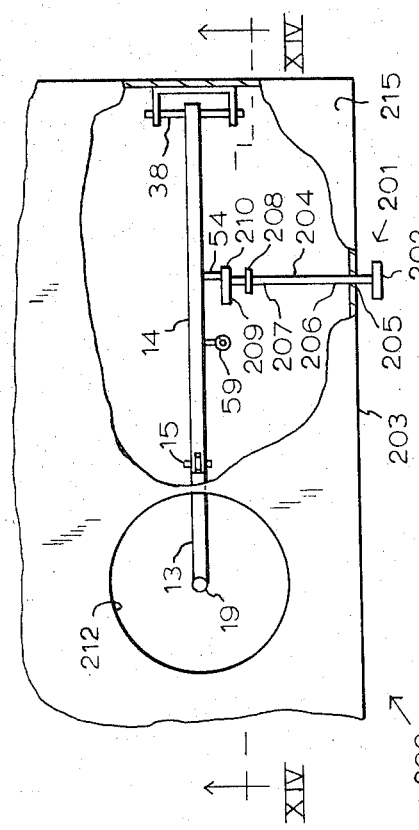
FIG. 13 is a cut-away top plan view of the stove shown in FIGS. 1 and 2 with front mounted controls.
Figure 14:
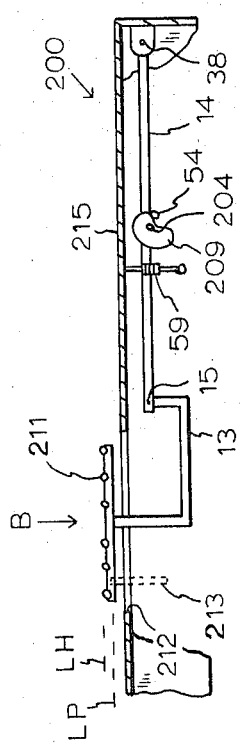
FIG. 14 is a cross-sectional side view of the stove shown in FIG. 13 taken along lines XIV—XIV.

Referring to FIGS. 13 and 14, there is shown another arrangement for controlling the vertical movement of the heating elements. FIG. 13 shows a partially cut-away top plan view of a portion of a stove 200 which is similar in all respects, except for the control means, to the stoves shown in FIGS. 1 thru 12. FIG. 14 is a cross-sectional side view of the stove in FIG. 13 taken along lines XIV—XIV in FIG. 13. The control means 201 is a front mounted control and operates similar to control means 17, shown in FIGS. 1, 2, 3 and 4. Referring to FIGS. 13 and 14, there is shown a control knob 202 which is located outside the front panel 203 of the stove 200. The control knob 202 is connected to a horizontally disposed control shaft 204 which traverses an opening 205 in the front panel 203 of the stove 200. The control shaft 204 is suitably supported at its front end 206 by the opening 205. The rearward end 207 of the control shaft 204 is supported by a bracket 208 which is secured in the stove 200. Secured to the end 207 of the control shaft 204 is an edge cam 209 which is arranged to be rotated on a horizontal axis by the control knob 202. The edge 210 of the edge cam 209 cooperates with the horizontal control rod 54 which is also shown for the arrangements in FIGS. 1 thru 12. The heating element and pot support arrangements in this stove 200 can be either of the types shown in FIGS. 1 thru 12. Still referring to FIGS. 13 and 14, when it is necessary to lower the heating element 211, (whichever type is used) the control knob 202 is rotated clock-wise which causes the edge 210 of the edge cam 209 to progress against the control rod 54, forcing it downwardly, against the upwardly urging action of the spring 59, and thereby lowering the support members 13 and 14 along with the heating element 211 which is supported by the said support members 13 and 14. The numerals 212 and 213 represent the element opening in the stove 200 and a portion of a pot support, respectively. Numeral 215 indicates the top panel of the stove 200.

Figure 15:
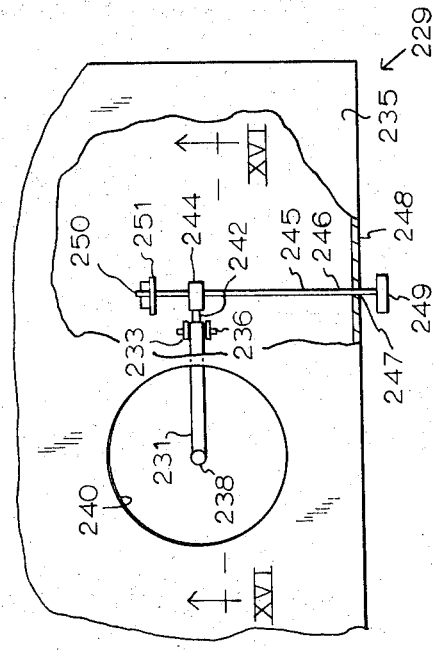
FIG. 15 is a partially cut-away top plan view of a portion of a stove constructed according to the principals of this invention; shown is an alternate method of supporting the heating element.
Figure 16:
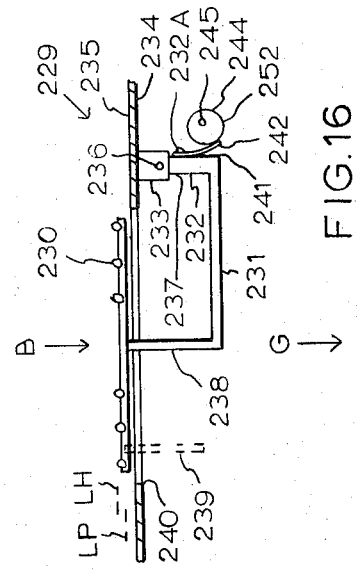
FIG. 16 is a cut-away side view of a portion of the stove shown in FIG. 15 taken along lines XVI—XVI.

FIGS. 15 and 16 show a stove 229 which is similar in all essential respects to the stoves shown in FIGS. 1 thru 14 except for a change in the support system which supports the heating element 230, which-ever type is used. FIG. 15 shows a top plan view of a portion of the stove 229. FIG. 16 shows a cross-sectional side view of a portion of the stove 229 taken substantially along lines XVI—XVI in FIG. 15. Referring to FIGS. 15 and 16, and particularly to FIG. 16, there is shown a heating element support member 231 which is similar to the support member 13, shown in FIGS. 1, 2, 7, 8, 9, 10 and 11, and which operates in the same manner, as shown in FIG. 7. In this arrangement, the support member 231 is hinged directly in the stove 229, or to a frame therein (not shown). The support member 231 does not depend on the hinged support member 14 for support.

Referring to FIG. 16, the heating element support 231 is shown as a "U" shaped member. One arm 232 of the support member 231 is pivotably supported by brackets 233 which are welded to the underside surface 234 of the top panel 235 of the stove 229, or to a frame (not shown) under said top panel 235. A horizontally disposed pivot pin 236 traverses the extreme end 237 of the arm 232 and the supporting brackets 233. The opposite, and free, end 238 of the support member 231 supports the heating element 230, which could be either of those shown and described in the foregoing description, and which is supported in the same way. A portion of a pot support 239 (shown in dotted lines) is shown for example purposes only. Numeral 240 indicates the element opening in the stove 229. The rear face 241 of the pivoted arm 232 of the support member 231 is provided with a leaf spring 242 which is attached to the said arm 232 by means of a screw 232A. The leaf spring 242 extends downwardly and slightly away from the face 241 of the arm 232 of the support member 231. As shown in FIGS. 15 and 16, an edge cam 244 is provided which cooperates with the support member 231 through the spring 242. The edge cam 244 is attached to a horizontally disposed control shaft 245. The front end 246 of the control shaft 245 traverses a bore 247 in the front panel 248 of the stove 229 and is supported by said bore 247.

A control knob 249 is attached to the front end 246 of the control shaft 245 which extends outside the front panel 248 of the stove 229. The rearward end 250 of the control shaft 245 is supported by a bracket 251 which is secured in the stove 229, or to a frame therein (not shown). Referring to FIG. 16, the horizontal top surface level LH of the heating element 230 is normally a slight distance above the horizontal top surface level LP of the pot suport 239. The weight of an empty pot placed on the heating element 230 is sufficient to lower the horizontal surface level LH of the heating element 230 to the horizontal surface level LP of the pot support 239, against the action of the upwardly urging spring 242.

In operation, and referring to FIGS. 15 and 16, when it is necessary to lower the heating element 230, during, or at the completion of a cooking cycle, the heat range control 18 (not shown in FIGS. 15 and 16) is turned to "OFF" position. The control knob 249 is then manually rotated clock-wise. As viewed in FIG. 16, the clock-wise rotation of the control knob 249 causes the edge cam 244 to rotate proportionately clock-wise. As the edge cam 244 rotates clock-wise, its edge portion 252 draws away from the cooperating spring 242 with the result that the heating element 230 and the supporting member 231 are pivotably lowered to the desired level through the acting force of gravity G, or by a lowering spring (not shown). Referring to FIGS. 14 and 16, when it is necessary to clean the stove, the heating elements 211 and 230 with their support members 13 and 231, respectively, are raised to a vertical position, as shown for the stove in FIG. 7. The latching means 29 and 31, shown in FIGS. 2 and 10, can be used in the stove arrangements shown in FIGS. 13 thru 16.

Referring to FIG. 3, the heat range selector switch 260 can be provided with a cam 261 which cooperates with the control rod 54 so that the heating element (whichever type is used) can be lowered when the heat range switch 260 is turned to the "OFF" position. The stove arrangement in FIGS. 15 and 16 may also have its heat range selector switch (not shown) provided with means to lower the heating element 230 by rotating the cam 244 when said switch is rotated to the "OFF" position.

It will be appreciated that other modifications and variations may be effected without departing from the spirit and scope of the novel concepts of this invention.

I claim as my invention:

1. In an electric stove, a horizontal top structure having an opening therein, stationary wall means below said opening, pot support means in said opening above said wall means and including a plurality of horizontally spaced portions having upper surfaces in a common horizontal plane for engaging and supporting the underside of a pot, an electric heating element including a plurality of spaced portions having surfaces in a common plane, heating element support means arranged to support said heating element in a first position in which said surfaces of said spaced portions thereof are disposed between said spaced portions of said pot support means with said surfaces of said spaced portions of said heating element being engaged with the underside of a pot supported on said pot support means and for allowing downward movement of said heating element to a second position in which said surfaces of said heating element are below said common horizontal plane of said surfaces of said pot support portions, said heating element support means including hinge means for pivotal movement of said heating element about a horizontal pivot axis adjacent one side of said opening and arranged to allow upward tilting movement of said heating element to a position in which said common plane of said surfaces of said heating element portions is generally vertical so as to allow access to said pot support portions and said wall means for cleaning thereof.

2. In an electric stove as defined in claim 1, said electric heating element having terminals disposed substantially in alignment with said horizontal pivot axis.

3. In an electric stove as defined in claim 1, said heating element support means including loosely coupled anti-rotational means.

4. In an electric stove as defined in claim 1, said pot support portions and said heating element portions being elongated generally straight portions and being disposed in horizontally spaced vertical planes.

5. In an electric stove as defined in claim 4, said horizontally spaced vertical planes being transverse to said horizontal pivot axis.

6. In an electric stove as defined in claim 1, said heating element support means including means supporting said heating element at substantially its balance center of gravity.

7. In an electric stove as defined in claim 1, said heating element support means including an arm carrying said heating element at one end thereof and having an opposite end pivotally supported by said hinge means.

8. In an electric stove as defined in claim 7, said arm including an upwardly extending portion centrally located relative to said heating element with said heating element being loosely supported on said upwardly extending portion.

9. In an electric stove as defined in claim 7, spring means acting to urge said arm upwardly, a rotatable control knob, and cam means operated by said control knob for moving said arm downwardly.

10. In an electric stove as defined in claim 7, said heating element support means further including a second arm having one end pivotally connected to the first arm by said hinge means and having an opposite end pivotal about a horizontal pivot axis, means limiting pivotal movement of said first arm relative to said second arm to limit downward movement of said heating element, and actuating means for controlling pivotal movement of said second arm to control movement of said heating element between said first and second positions.

11. In an electric stove as defined in claim 10, spring means urging said second arm upwardly, a control knob, and cam means operated by said knob for moving said second arm downwardly.

12. In an electric stove as defined in claim 7, said pivot axis being in fixed relation to said top structure.

13. In an electric stove as defined in claim 1, said pot support means including a ring at the periphery of said opening and having an upper surface in said common plane of said upper surfaces of said portions of said pot support means, said ring having openings therein allowing flow of air upwardly and outwardly from the space below said horizontal top structure.

* * * * *